(12) United States Patent
Van Meter

(10) Patent No.: US 7,328,723 B1
(45) Date of Patent: Feb. 12, 2008

(54) PIPE NIPPLE PROTECTIVE SLEEVE

(76) Inventor: Brett Van Meter, P.O. Box 720138, Summitt, UT (US) 84772

( * ) Notice: Subject to any disclaimer, the term of this patent is extended or adjusted under 35 U.S.C. 154(b) by 0 days.

(21) Appl. No.: 11/699,041

(22) Filed: Jan. 29, 2007

(51) Int. Cl.
    *F16L 57/00* (2006.01)
(52) U.S. Cl. .................................. 138/96 R; 138/89.4
(58) Field of Classification Search ............. 138/96 R, 138/96 T, 89.4
    See application file for complete search history.

(56) References Cited

U.S. PATENT DOCUMENTS

| 2,454,555 | A | * | 11/1948 | Henderson et al. ........... 138/89 |
| 3,800,486 | A | * | 4/1974 | Harvey ........................... 52/98 |
| 4,623,170 | A | * | 11/1986 | Cornwall ........................ 285/4 |
| 4,899,903 | A | * | 2/1990 | Miyasaka et al. ............ 220/266 |
| 5,161,581 | A | * | 11/1992 | Scheetz ..................... 138/96 R |
| 5,520,219 | A | * | 5/1996 | Hessian ......................... 138/90 |
| 5,908,048 | A | * | 6/1999 | Van Driel ...................... 138/89 |
| 5,996,134 | A | * | 12/1999 | Senninger ................... 4/252.4 |
| 6,378,912 | B1 | * | 4/2002 | Condon et al. ............. 285/220 |
| 6,520,212 | B1 | * | 2/2003 | Blivet ....................... 138/96 R |
| 6,595,243 | B2 | * | 7/2003 | Tarr ......................... 138/96 R |

* cited by examiner

*Primary Examiner*—James Hook
(74) *Attorney, Agent, or Firm*—M. Reid Russell

(57) ABSTRACT

A pipe nipple protective sleeve that includes a sheath that is closed at a forward end and connects to a collar at an open rear end, where the collar is open into the sheath and the collar hole and sheath diameters and the sheath length are selected to fit over a particular diameter and length of a pipe nipple as projects from a wall of a building under construction, with the sheath to fit over and cover the pipe nipple and the collar is to receive fasteners, such as staples, driven there through for mounting it onto a wall stud or sheet rock surface adjacent to the pipe nipple. With the pipe nipple protective sleeve installed onto the pipe nipple, a section of skeet rock that the pipe nipple is fitted through, is textured, painted or tiled over during the wall finishing and, after completion of the wall finishing, the sheath is separated from the collar, exposing the nipple surface that is free of contaminants and is ready for receiving a fitting or fixture attached thereto.

3 Claims, 5 Drawing Sheets

PIPE NIPPLE PROTECTIVE SLEEVE

BACKGROUND OF THE INVENTION

1. Field of the Invention

The present invention pertains to devices for fitting over a pipe nipple that closes a water line in a building construction process to protect the pipe nipple surface against contamination during sheet rock installation and texturing to facilitate connection of the pipe nipple onto a fitting or a fixture, such as a water control tap.

2. Prior Art

It is common practice in construction to cover a pipe nipple that extends from a wall into a room with tape, such as duct tape, or the like. The wrap then stays on the pipe nipple over the period of time that it takes to install sheet rock, texture and paint the walls, and longer depending upon the pipe nipple location. Over which time period the tape adhesive remains bonded to the pipe nipple surface, firmly attaching thereto as a contaminate and, where the tape does not fully cover the nipple, the pipe nipple may itself receive and bond to the texturing materials, paint and tile grout as used in forming and finishing the wall. Which tape and tape adhesive, sheet rock, sheet rock mud, texturing material, paint and tile grout contamination must be completely removed and the pipe nipple surface cleaned to provide a leak proof joint when a fitting or fixture is connected thereto. In practice, thoroughly cleaning each pipe nipple of contaminates is very time consuming and, unless it is done properly, leakage at joints is likely. The invention, solves this problem with a pipe nipple protection sleeve that includes a sheath that is closed on a forward end, is of a length to fit over the length of the pipe nipple as extends from a the sheet rocked wall, or other wall surface, and includes a collar for mounting to the wall framing as with fasteners, such as staples, and covered by the applied sheet rock wall, wall texturing, paint or tile, and holds the sheath in place during the wall finishing process. Whereafter, when the wall surface is fully finished and a plumber is ready to connect lines or fitting onto the pipe nipple, the sheath is easily removed at or near the sheath junction with the collar and the sheath is then pulled off of the pipe nipple, leaving the collar buried in the wall. With the sheath removed, the pipe nipple is thereby provided with a clean surface for securely attaching a fitting or fixture to.

SUMMARY OF THE INVENTION

The invention is in a pipe nipple protective sleeve for maintaining the integrity of a pipe nipple surface that extends out from a building wall, keeping that pipe nipple surface clean during wall finishing procedures, such as application of sheet rock, wall texturing, painting or tile installation. The use of the pipe nipple protective sleeve provides a clean surface to a plumber, greatly simplifying the connection of connectors and fixtures onto that pipe nipple to provide a secure joint that will not leak under pressure. The invention can be used for gas lines and for lines that are under pressure, such as water lines. The pipe nipple cover of the invention includes a sheath that is closed on a forward end and connects, at a right angle, onto a flat collar on its opposite open end. The nipple cover sheath and collar are preferably formed from a thin plastic material, with the sheath to fit over the pipe nipple to where the collar contacts the wall frame surface wherefrom the pipe nipple extends. So arranged, the collar is secured, as by nailing, stapling, or the like, to the wall frame surface, and receives a layer of sheet rock, wall board, or the like that, in turn receives an application of wall texturing material, paint, tile and/or the like, applied thereto during the wall finishing process. Upon completion of the building interior wall finishing, when a plumber is ready to secure a fitting or fixture thereto, the sheath is twisted, pulled or cut away from the collar, leaving the collar in the wall, and the sheath is pulled off of the pipe nipple, exposing the pipe nipple surface that has remained free of contaminates during the wall finishing. The clean pipe nipple end is thereby immediately ready for mounting the fitting or fixture thereto.

It is a principal object of the present invention to provide a pipe nipple protective sleeve for protecting a pipe nipple from contaminates, keeping the outer surface thereof clean where the pipe nipple has been installed through a building wall during a wall forming and finishing process that may include sheet rock installation, texturing, painting or tile of that wall surface.

Another object of the present invention is to provide a pipe nipple protective sleeve that can be quickly and easily installed over a pipe nipple that has been fitted in a building frame and wall during building construction, and with the pipe nipple protective sleeve to remain in place during wall forming and finishing, where a pipe nipple sheath is easily removed to expose a clean pipe nipple surface that is free of contaminates and is ready to receive a fitting or fixture attached thereto.

Still another object of the present invention is to provide a pipe nipple protective sleeve that includes a tubular shaped sheath that is closed at a forward end and is attached to a collar at an open rear end, with the sheath sized for fitting over, to cover, a pipe nipple that extends from a wall flame of a building under construction and with the collar arranged for attachment in that wall to be covered with sheet rock and coated during wall texturing, painting or tile installation, whereafter the sheath is removed from the collar that remains in the wall, exposing the pipe nipple surface.

Still another object of the present invention is to provide a pipe nipple protective sleeve that is easy and inexpensive to fabricate, is quickly installed over a pipe nipple to keep that pipe nipple surface clean of contaminates during wall finishing, and is easily removed from its collar portion that remains in the wall, exposing the pipe nipple surface that is to receive a fitting or fixture attached thereto.

BRIEF DESCRIPTION OF THE DRAWINGS

These and other objects and features of the present invention will become more apparent from the following description in which the invention is described in detail in conjunction with the accompanying drawings.

DETAILED DESCRIPTION

Figure 1:
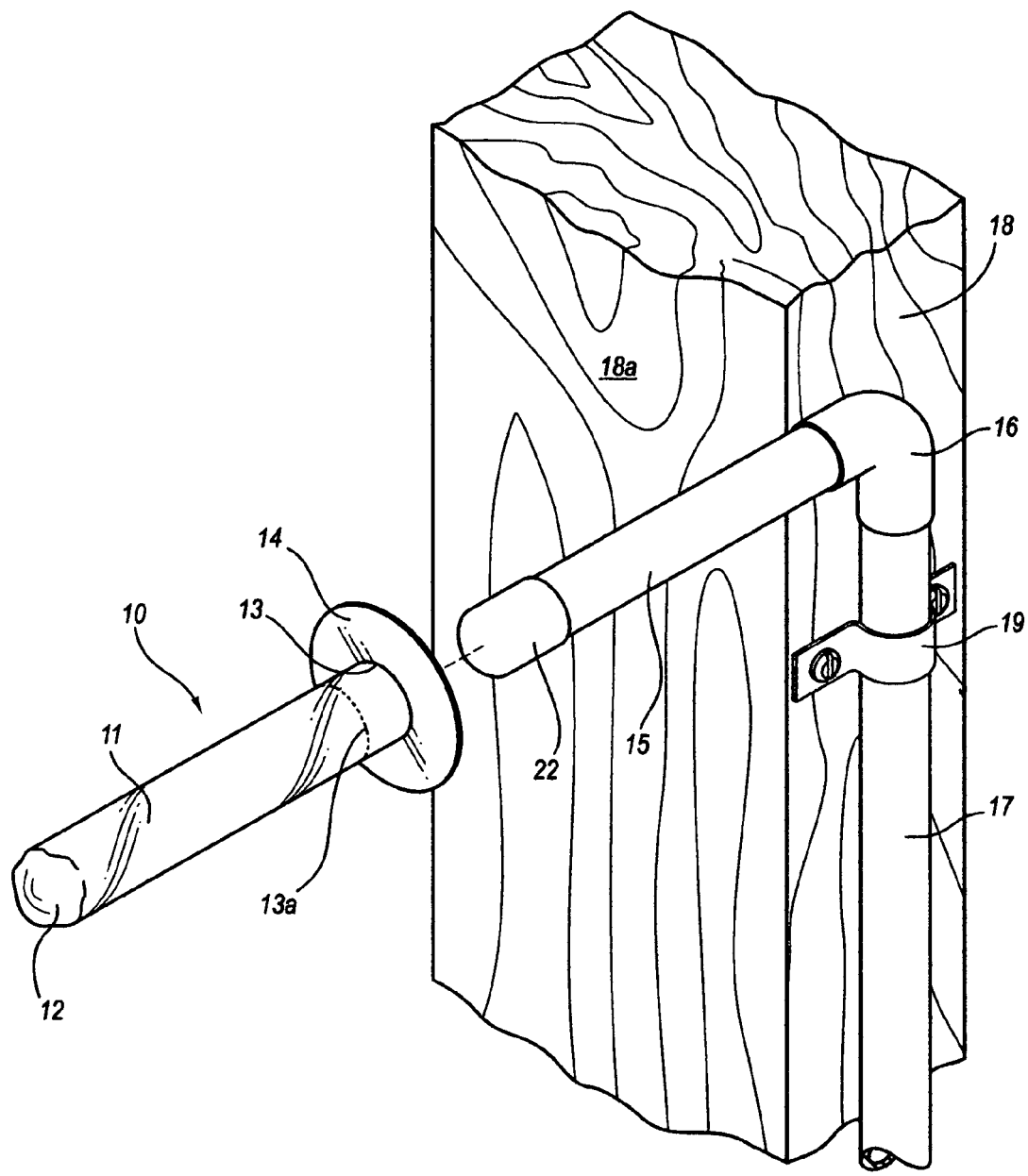
FIG. 1 is a side elevation perspective view of the invention in a pipe nipple protective sleeve of the invention that includes a sheath that is shown as closed on a forward end and is attached to a collar at its open rear end, and shows the collar attached to the sheath open rear end, forming a right angle, and with the sheath open rear end aligned for sliding over a pipe nipple that is mounted in a wall frame, and with the pipe nipple shown extending out of the wall frame.

The invention is in a pipe nipple protective sleeve 10 that is shown in FIG. 1 as including a cylindrical sheath 11 that is closed on a forward end 12, and attaches at an open rear end 13 onto a flat disk shaped collar 14. The sheath 11 and connected collar 14 can be formed from the same or different material, and is preferably a thin plastic material, that is selected to be durable enough to resist tearing when installed over a pipe nipple 15. In practice, a polyvinyl plastic having a thickness of from one sixty fourth to one sixteenth (1/64 to 1/16) of an inch has been used to form the pipe nipple cover 10 of the invention.

FIG. 1 shows the pipe nipple protective sleeve 10 aligned for fitting over the pipe nipple 15 that is shown connected through an elbow 16 into a line 17 that is held onto to a wall frame stud 18 by a bracket 19. Shown in FIGS. 2 and 3, the pipe nipple protective sleeve 10 has been installed onto the stud 18 outer face 18a that is shown as having received a section of sheet rock 20 mounted thereto, with the pipe nipple 15 shown as having passed through a hole 21 in the section of sheet rock and extends outward therefrom. The pipe nipple 15 open end is shown as having received a cap 22 fitted there over, and may be under pressure.

Figure 2:
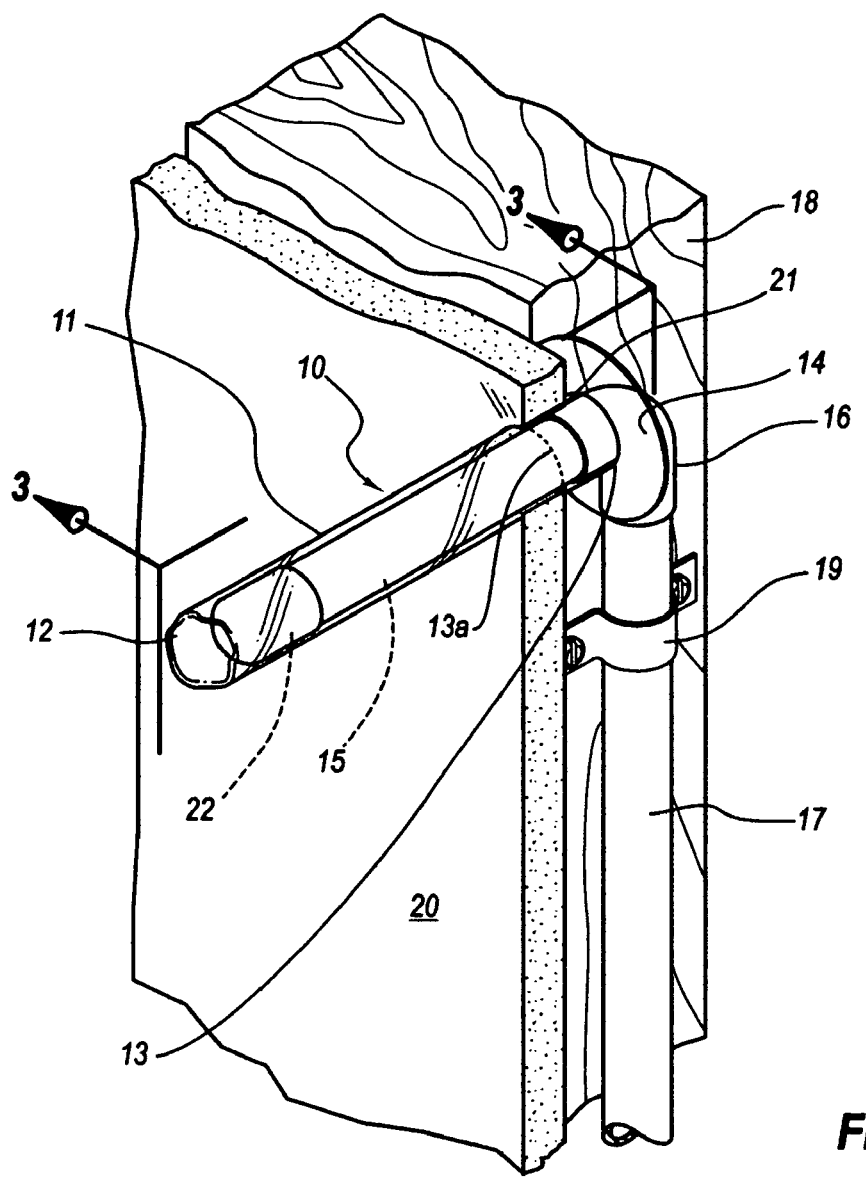
FIG. 2 shows the pipe nipple of FIG. 1 as having received the pipe nipple protective sleeve slid there over to where the collar rear surface engages the wall frame surface that has received a section of sheet rock applied thereover.
Figure 3:
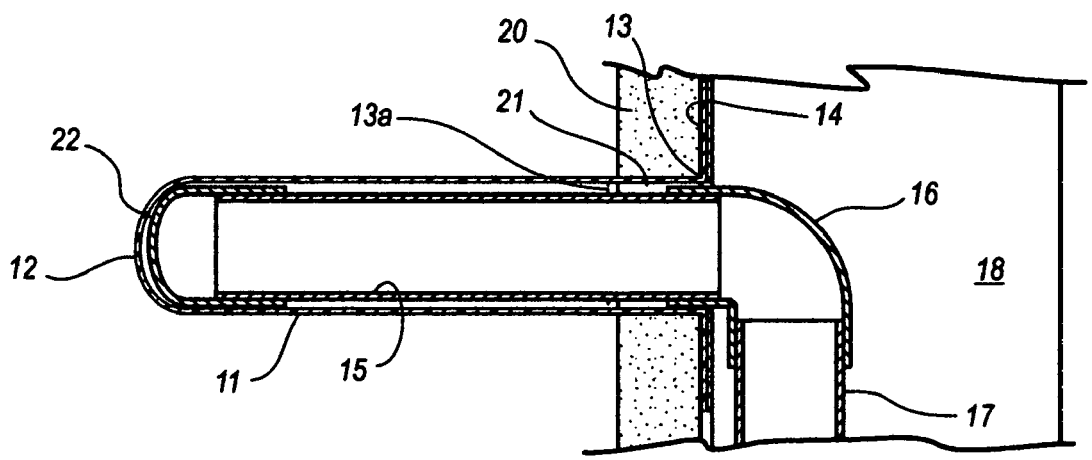
FIG. 3 is a side elevation sectional view taken along the line 3-3 of FIG. 2.
Figure 4:
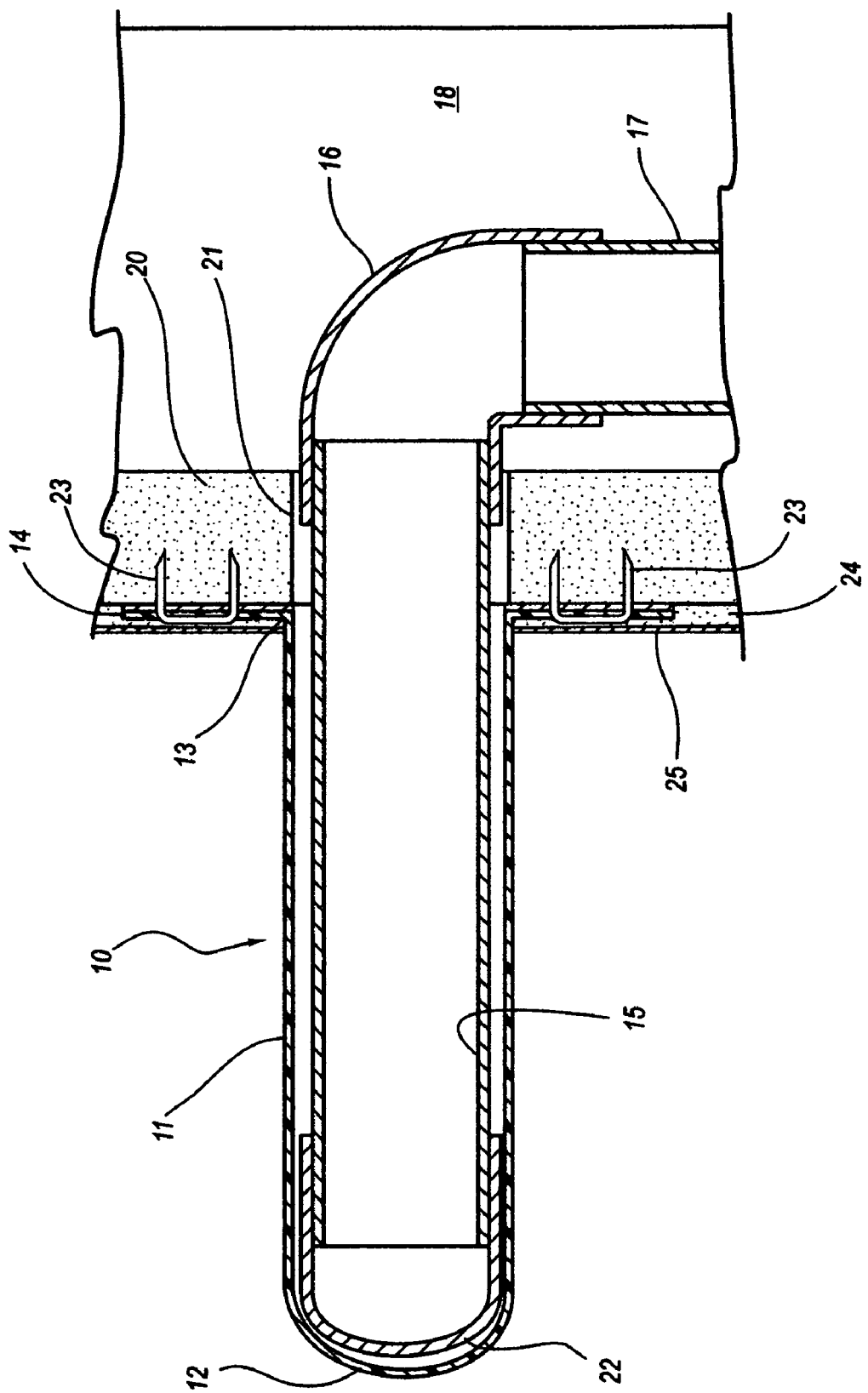
FIG. 4 shows an enlarged view like that of FIG. 3 with the collar shown as having been attached by staples onto the sheet rock wall surface and fitted through a hole formed through the section of sheet rock where through the pipe nipple is passed and showing layer of texturing and paint as having been applied over the wall that is covered by the section of sheet rock.

FIGS. 2 and 3 show the pipe nipple protective sleeve 10 that has having been fitted onto the pipe nipple 15, with the sheath 11 closed end 12 located proximate to the pipe nipple cap 22 and with the flat collar 14 shown as being mounted onto the stud 18 and beneath the section of sheet rock 20, with the pipe nipple sheath 11 fitted through the hole 21. FIG. 4 shows the same pipe nipple protective sleeve 10 installed onto a pipe nipple 15 but shows the flat collar 14 as having been mounted onto an outer face of a section of sheet rock 20 that has been installed over the studs 18. Which collar 14 installation is shown as provided by driving staples 23 through the collar 14 and into the section of sheet rock 20. FIG. 4 is an enlarged profile sectional view of the pipe nipple protective sleeve 10 installed over the pipe nipple 15, and shows the sheath 11 end 12 in close fitting arrangement over the pipe nipple 15 end cap 22, and with the flat collar 14 shown as receiving coatings, respectively, of texturing 24 and paint 25, that has been applied onto the sheet rock 20 surface, and with the sheath 11 shown as having been fitted through the hole 21 through the section of sheet rock 20.

FIGS. 2, 3 and 4, illustrate that the pipe nipple protective cover collar 14 can be installed onto the outer surface of the frame 18 or onto an outer surface of the section of sheet rock 20, within the scope of this disclosure, and which installation can be by staples 23, as shown in FIG. 4, or with any other appropriate fasteners, within the scope of this disclosure.

Figure 5:
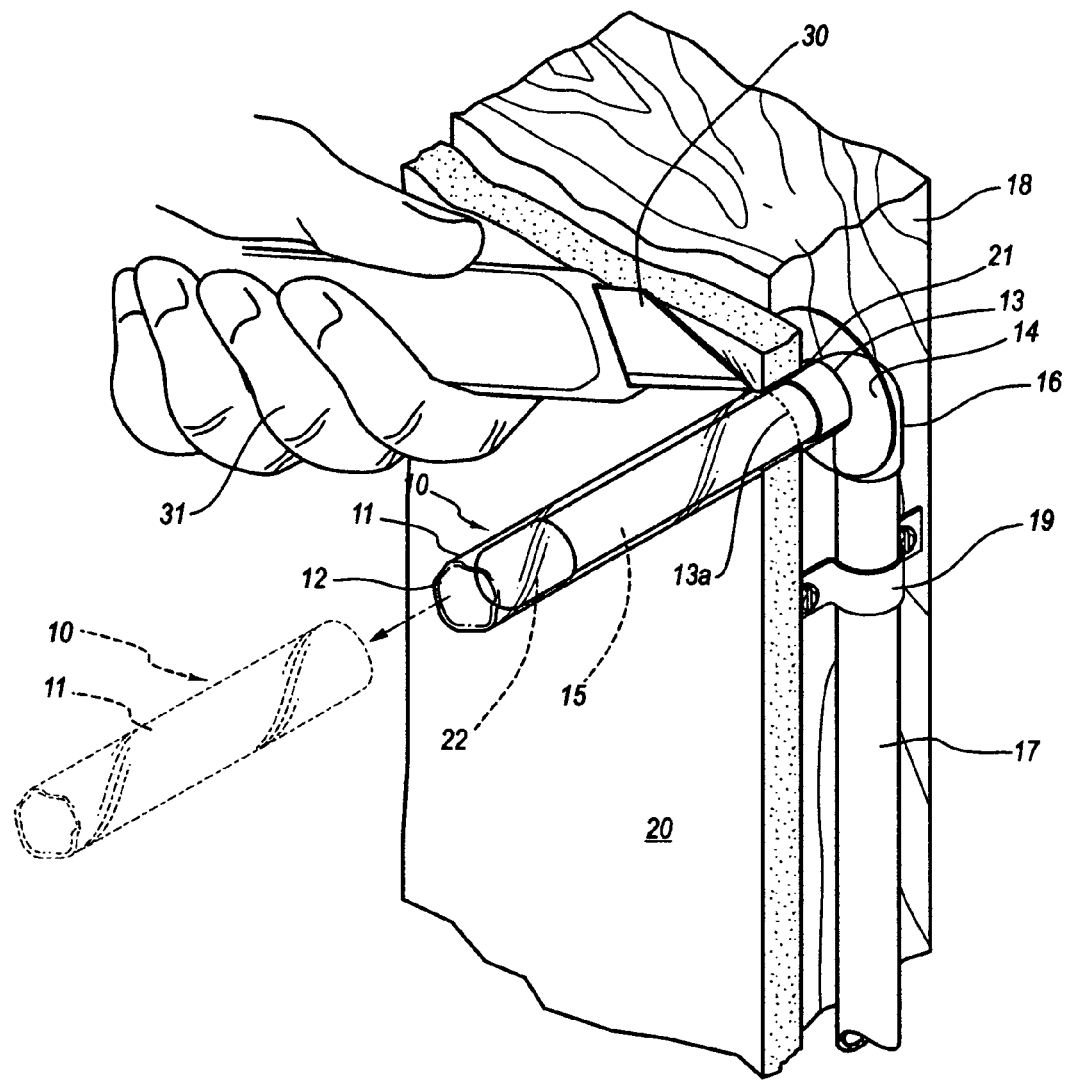
FIG. 5 shows a view like that of FIG. 1, after the pipe nipple collar installed in a wall and the wall finished, and showing an operator's hand holding a knife and cutting around the junction of the sheath to the section of sheet rock, and showing in broken lines the sheath as having been pulled from the collar and off of the pipe nipple, with the collar shown remaining in the finished wall.

FIG. 5 is a view like that of FIG. 3 showing the collar 14 as having been mounted onto the stud 18 surface, and the section of sheet rock 20 applied thereover; and showing the pipe nipple 15 as mounting the pipe nipple protective sleeve 10. So arranged, the collar 14 is fixed in the wall. As shown in FIG. 5, to separate the sheath 11 from the collar 13, an operator, shown as hand 31, holds a knife 30 that they use to cut the sheath 11 surface proximate to the edge of the sheet rock hole 21. Which knife contact location can, within the scope of this disclosure, include markings 13a to guide such cutting. Which markings, as discussed below with respect to FIG. 6, can be perforations 13a. With the sheath 11 cut therearound, the sheath 11 can then be pulled off of the pipe nipple 15, as shown in broken lines, with the pipe nipple 15 then ready to receive a fitting or fixture secured thereto.

Figure 6:
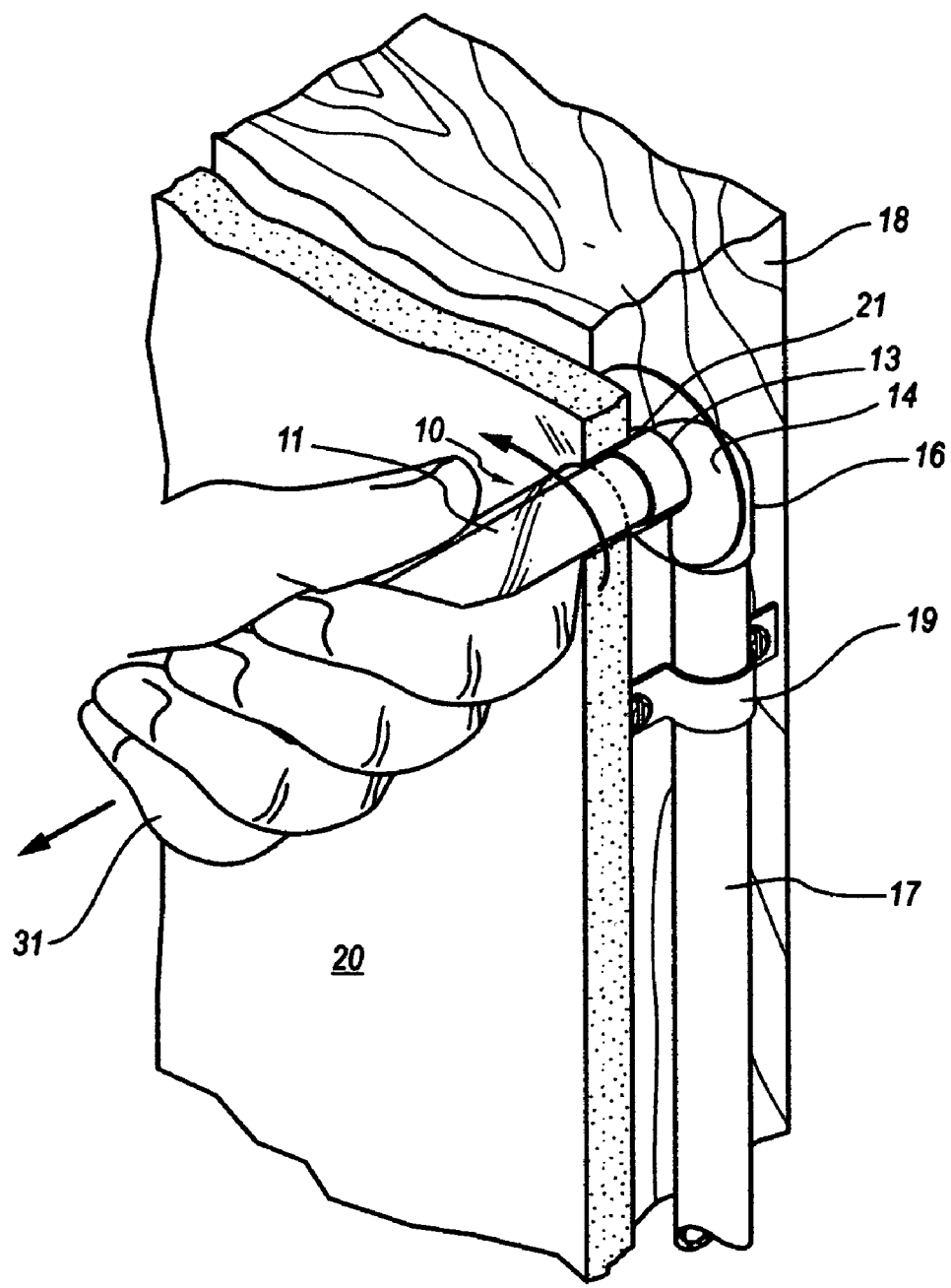
FIG. 6 shows a view like that of FIG. 5 only showing the pipe nipple collar as having been mounted to the wall frame and showing the sheath as having been scored proximate to its junction with the collar and shows another operator's hand gripping the pipe nipple sheath and twisting it, as shown by a curved arrow, to separate it along the perforations, separating it from the pipe nipple collar and, showing with a straight arrow, the pipe nipple sheath being pulled off of the pipe nipple, with the collar shown remaining in the finished wall between the wall frame and sheet rock undersurface.

FIG. 6 is a view like that of FIG. 5 only showing an operator's hand 34 as gripping the sheath 11 and twisting it, as shown by a curved arrow. Which twisting causes the sheath 11 to tear along markings 13a that are preferably perforations, separating is from the collar 14. The perforations 13a, as shown, are formed around the sheath 11, proximate to the junction 13, to essentially be within the finished wall, so as not to compromise the pipe nipple protective sleeve 10 integrity. With the sheath 11 separated along the perforations 13a, the sheath is pulled off the pipe nipple 15, as indicated by a straight arrow, with that pipe nipple then being ready to receive a fitting or fixture secured thereto.

Hereinabove has been set out a description of a preferred embodiment of the pipe nipple protective sleeve of the invention. It should however, be understood that the present invention can be varied within the scope of this disclosure without departing from the subject matter coming within the scope of the following claims, and a reasonable equivalency thereof, which claims I regard as my invention.

I claim:

1. A pipe nipple protective sleeve comprising, a cylindrical sheath formed from a thin flexible plastic material having a thickness of from one sixty fourth (1/64) to one sixteenth (1/16) of an inch that will fit closely to and cover a pipe nipple that can be but may not be under pressure to keep said pipe nipple surface free of contaminates during a wall finishing process, and which said sheath is closed at a forward end and connects, around an edge of an open rear end, to an edge of a center hole that is formed through a flat disk that is also formed from the same, or from a like, thin plastic material, and which said flat disk forms a right or normal angle to an outer surface of said sheath at said sheath and said flat disk junction.

2. The pipe nipple protective sleeve as recited in claim 1, wherein the thin plastic material is a polyvinyl chloride plastic material.

3. The pipe nipple protective sleeve as recited in claim 1, further includes perforations formed around the cylindrical sheath, proximate to the junction of said cylindrical sheath and the flat disk.

* * * * *